US008151571B2

(12) United States Patent
Maly et al.

(10) Patent No.: US 8,151,571 B2
(45) Date of Patent: Apr. 10, 2012

(54) SYSTEMS AND METHODS FOR CLOSED LOOP EMISSIONS CONTROL

(75) Inventors: Peter Martin Maly, Lake Forrest, CA (US); Jamison W. Janawitz, Overland Park, KS (US); William Eberhardt, Cherry Hill, NJ (US); Mark Holt, Emmaus, PA (US); Yu Wang, North Wales, PA (US)

(73) Assignee: General Electric Company, Schenectady, NY (US)

( * ) Notice: Subject to any disclaimer, the term of this patent is extended or adjusted under 35 U.S.C. 154(b) by 299 days.

(21) Appl. No.: 12/562,235

(22) Filed: Sep. 18, 2009

(65) Prior Publication Data
US 2011/0067408 A1 Mar. 24, 2011

(51) Int. Cl.
*F02C 1/00* (2006.01)

(52) U.S. Cl. .............................. 60/772; 60/39.5; 60/773

(58) Field of Classification Search .................. 60/39.5, 60/772–773, 776, 39.281; 356/326, 327; 92/5 R; 91/1
See application file for complete search history.

(56) References Cited

U.S. PATENT DOCUMENTS

| 5,257,496 A * | 11/1993 | Brown et al. ...................... 60/773 |
| 6,057,917 A * | 5/2000 | Petersen et al. ................ 356/213 |
| 6,268,913 B1 * | 7/2001 | Rising ........................... 356/326 |
| 7,414,726 B1 * | 8/2008 | Bambeck ........................ 356/436 |
| 8,018,590 B2 * | 9/2011 | Davis et al. ..................... 356/311 |
| 2007/0234730 A1 * | 10/2007 | Markham et al. ................ 60/772 |
| 2009/0280003 A1 * | 11/2009 | Schriner et al. ................. 415/13 |
| 2010/0313572 A1 * | 12/2010 | McManus et al. ............... 60/773 |

FOREIGN PATENT DOCUMENTS

| DE | 4316761 A1 | 11/1994 |
| DE | 19944006 A1 | 3/2001 |
| EP | 0881373 A2 | 12/1998 |
| GB | 2428087 A | 1/2007 |
| GB | 2459761 A | 11/2009 |
| WO | 2008/015292 A1 | 2/2008 |
| WO | 2008147994 A1 | 12/2008 |

OTHER PUBLICATIONS

Disclosure under 37 CFR 1.56 dated Sep. 18, 2009.
Search Report issued in connection with GB Application No. GB1014840.1, Jan. 7, 2011.

* cited by examiner

*Primary Examiner* — Louis Casaregola
*Assistant Examiner* — Phutthiwat Wongwian
(74) *Attorney, Agent, or Firm* — Sutherland Asbill & Brennan LLP

(57) ABSTRACT

Systems and methods for controlling combustion emission parameters associated with a gas turbine combustor. The method can include providing an optical path through a gas turbine exhaust duct, propagating light along the optical path, measuring exhaust species absorption of the light within the gas turbine exhaust duct, and controlling at least one of the combustion parameters based at least in part on the measured exhaust species absorption.

19 Claims, 3 Drawing Sheets

SYSTEMS AND METHODS FOR CLOSED LOOP EMISSIONS CONTROL

FIELD OF THE INVENTION

This invention generally relates to turbine emissions control, and more particularly relates to systems and methods for closed loop emissions control.

BACKGROUND OF THE INVENTION

Industrial gas turbines often require complex control systems for efficiently converting energy while minimizing polluting emissions. Pollutants such as nitrogen oxide may be reduced by lowering the maximum gas temperature, which may be achieved by maintaining a lean fuel-to-air ratio in the combustion chamber. However, if the fuel/air mixture is too lean, incomplete fuel combustion can produce excessive carbon monoxide and unburned hydrocarbons. Other operational problems emerge when operating with lean combustion, including unstable load transitions and combustion instabilities. Therefore, the fuel/air mixture and the temperature in the reaction zone must be controlled to support complete combustion.

Systems have been proposed for controlling the fuel/air mixture by measuring various combustion parameters, and by using the measurements as input to control the fuel system. For example, one conventional system includes a control system where fuel flow rates, pressure levels, and discharge exhaust temperature distributions are utilized as input for setting fuel trim control valves.

Other techniques for controlling combustion dynamics include measuring light emission from the combustion burner flame, and using the measured signal to control certain combustion parameters. For example, one conventional system uses a closed loop feedback system employing a silicon carbide photodiode to sense the combustion flame temperature via the measurement of ultraviolet radiation intensity. The sensed ultraviolet radiation is utilized to control the fuel/air ratio of the fuel mixture to keep the temperature of the flame below a predetermined level associated with a desired low level of nitrogen oxides.

Other conventional systems can use optical fibers for gathering and transmitting light from a combustion region to detectors. Yet other conventional systems can use a video camera to capture images of the flame primarily for monitoring the presence or absence of a flame.

Mass flux sensing techniques have been proposed for use in turbines. For example, laser-based Doppler-shift measurement systems may be used for determining airflow in a turbine air-inlet duct, and similar systems have been proposed for measuring the static temperature by comparing the absorption features from two light generators (lasers) of different frequency. A need remains for improved systems and methods for closed loop emission control.

BRIEF SUMMARY OF THE INVENTION

Some or all of the above needs may be addressed by certain embodiments of the invention. Certain embodiments of the invention may include systems and methods for closed loop emissions control.

According to an example embodiment of the invention, a method for controlling combustion emission parameters associated with a gas turbine combustor is provided. The method can include providing an optical path through a gas turbine exhaust duct, propagating light along the optical path, measuring exhaust species absorption of the light within the gas turbine exhaust duct, and controlling at least one of the combustion parameters based at least in part on the measured exhaust species absorption.

According to another example embodiment, a system for controlling combustion emission parameters associated with a gas turbine combustor is provided. The system can include one or more photodetectors in communication with an optical path through a gas turbine exhaust duct, one or more light sources operable to propagate light along the optical path to the one or more photodetectors, and a control device operable to control at least one of the combustion emission parameters based at least in part on one or more signals from the one or more photodetectors.

According to another example embodiment, a gas turbine is provided. The gas turbine can include a combustor, an exhaust duct, an optical path through the exhaust duct, one or more photodetectors in communication with the optical path, and one or more light sources operable to propagate light along the optical path to the one or more photodetectors.

Other embodiments and aspects of the invention are described in detail herein and are considered a part of the claimed invention. Other embodiments and aspects can be understood with reference to the following detailed description, accompanying drawings, and appended claims.

BRIEF DESCRIPTION OF THE FIGURES

Reference will now be made to the accompanying tables and drawings, which are not necessarily drawn to scale, and wherein.

Table 1 lists example measurable exhaust species and light absorption wavelengths, according to example embodiments of the invention.

DETAILED DESCRIPTION OF THE INVENTION

Figure 1:
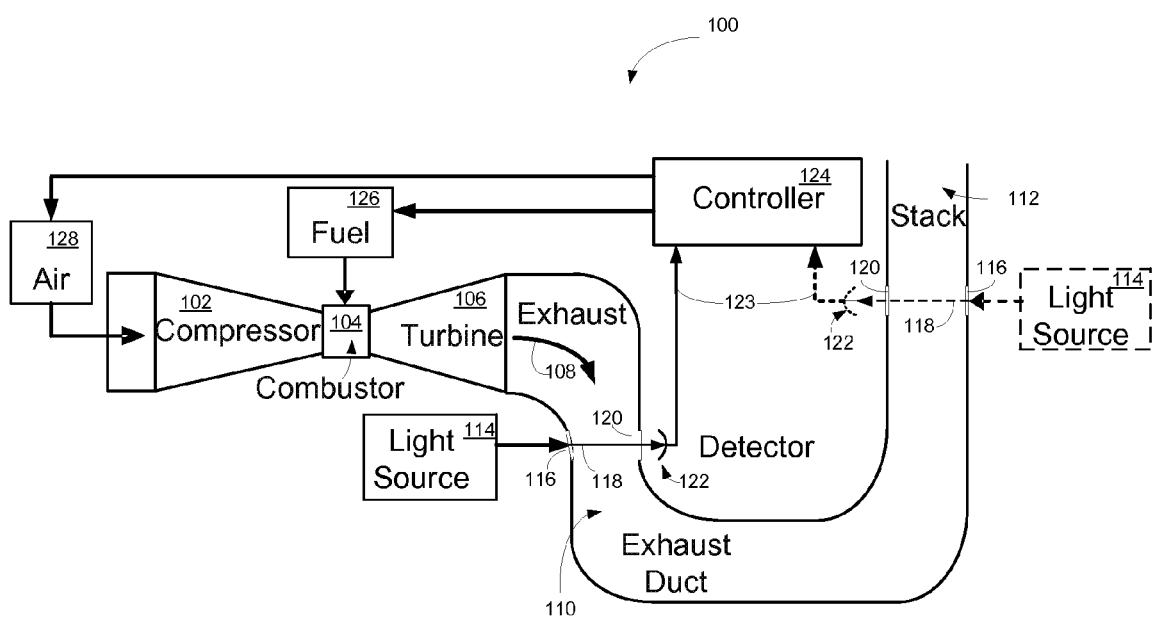
FIG. 1 is a diagram of an illustrative optical interrogation system in communication with the turbine combustor exhaust duct, according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable combustion emission parameters to be measured in the exhaust duct of a turbine combustor by probing or interrogating the exhaust duct with light to detect the temporal and/or spectral attenuation of the light after it has passed through the regions of interest. According to embodiments of the invention, the measured combustion parameters may in turn be utilized to control various parameters of the combustor, including, but not limited to fuel flow rates, fuel/air ratios, combustor balance, and fuel flow distributions to optimize operating parameters including, but not limited to nitrous oxide emissions, dynamic pressure oscillations, and fuel efficiencies.

According to certain example embodiments of the invention, specific emission species may be monitored within the combustor exhaust duct or exhaust stack by utilizing the principle of light absorption. According to an example embodiment, light launched through a combustor exhaust duct may be measured to determine the presence and concentration of exhaust species via the spectral and/or temporal attenuation of the light. According to embodiments of the invention, the light that is utilized to measure the exhaust species may include mid IR (infrared) wavelengths in the range of 3.5 to 24 microns. According to other embodiments of the invention, the light that is utilized to measure the exhaust species may include additional wavelengths in the range of 1.0 to 3.5 microns and 24 to 500 microns. According to example embodiments, the spectrum-resolved light absorption may be used to identify chemical species including but not limited to NO, NO2, CO, CO2, SO2, and H2O. The measured signals may be correlated with the fuel-to-air ratio, fuel flow distribution, airflow rate, water injection rate, heat release rate, combustor balance, temperature, etc. In addition, the absorption signals may be used as feedback for use in a closed-loop combustion control system. Table 1 below lists some of the example detectable exhaust species and the associated absorption wavelengths at ambient temperature.

TABLE 1

| Exhaust Species Detectable | Wavelength (microns) | Wavenumber (cm$^{-1}$) |
|---|---|---|
| CO2 | 4.42 | 2262 |
| CO2, N2O | 4.48 | 2232 |
| CO2, CO | 4.86 | 2058 |
| CO2, CO | 4.87 | 2053 |
| NO, H2O | 5.25 | 1905 |
| NO | 5.45 | 1835 |
| NO2 | 6.13 | 1631 |
| NO2, NH3 | 6.29 | 1590 |
| SO2, H2S, CH4 | 7.43 | 1346 |
| N2O, CH4, H2S | 7.62 | 1312 |
| H2O, CH4, N2O, C2H2, H2S | 7.85 | 1274 |
| H2O, CH4, N2O, C2H2, H2S | 7.87 | 1271 |
| NH3 | 10.09 | 991 |

Various sensor options and configurations for combustion control applications, according to embodiments of the invention, will now be described with reference to the accompanying figures.

FIG. 1 illustrates an example closed loop emissions control system 100, according to example embodiments of the invention, for sensing and controlling emission parameters associated with various components of a gas turbine 102, 104, 106. According to certain example embodiments of the invention, a combustor 104 may receive air 128 via a compressor 102. The combustor 104 may also receive fuel 126, and may combine and ignite the air 128 and fuel 126 within the combustor 104 to produce flames and a high-pressure region that may be used to rotate a turbine 106. Emissions or exhaust 108 exiting the turbine 106 may be routed to an exit stack 112 via an exhaust duct 110.

According to example embodiments of the invention, one or more light sources 114 and one or more detectors 122 components may be placed or mounted adjacent to the exhaust duct 110. In one example embodiment, light from the light source 114 may pass through an optically transparent input port 116 and may interact with the exhaust 108 within the exhaust duct 110. The light 118 interacting with the exhaust may exit the exhaust duct 110 via an optically transparent output port 120. The portion of the light 118 interacting with the exhaust may undergo spectral attenuation due to specific wavelength absorption of the light 118 by emission species present in the exhaust 108. The light exiting the exhaust duct 110 may be incident on an optical detector 122, and the resulting detector signal 123 may be utilized by controller 124 for closed-loop control of fuel 126, air 128, combustor balance, and/or any number of variables associated with the turbine 106.

FIG. 1 illustrates two example placements and embodiments of the optical interrogation system, including the light source 114, input port 116, output port 120, and optical detector 122. One example embodiment illustrates the interrogation system near the exhaust duct 110, and one example embodiment illustrates the interrogation system near the exhaust stack 112. One or more such systems may be placed at any suitable location within the combustor exhaust system according to certain embodiments of the invention.

According to an example embodiment of the invention, a light source 114 may generate light for interrogating the exhaust. The generated light may propagate through an inner portion of the exhaust duct 110 via a number of associated optical components. According to an example embodiment, the light generated by the light source 114 may be coupled into a waveguide such as an optical fiber, for convenient routing to an appropriate entry region at the exhaust duct 110. According to an example embodiment, the light propagating out of the waveguide or optical fiber may undergo divergence and may result in a spreading or diverging optical beam that may be collimated by a lens or concave mirror to produce a collimated optical beam. According to another example embodiment, the light produced by the light source (particularly if it is already collimated by the light source) may travel through free-space and may reach the input port 116 directly, or via reflecting mirrors or intervening optics. The input port 116 and an output port 120 may be provided in the body of the exhaust duct 110 to allow the optical energy to pass through at least a portion of the exhaust duct 110 and interact with the exhaust 108. The input port 116 and output port 120 may be constructed from high temperature-resistant, optically transparent material such as quartz, sapphire, or other suitable materials with low loss and a transmission bandwidth appropriate for the wavelengths of interest.

According to example embodiments of the invention, two or more optical ports 116 120 may be positioned on the exhaust duct 110 or exhaust stack 112 at various locations for measuring emission species at different points along the exhaust path. According to example embodiments, the portion of light 118 propagating within the exhaust duct 110 may interact with emission species, and because of the path-averaged interaction with the species, may undergo wavelength-specific spectral attenuation that may correlate with the concentration of the particular emission species present in the exhaust 108.

According to an example embodiment of the invention, the spectrally attenuated light exiting the exhaust duct through the output port 120 may pass through a lens or concave mirror to produce a converging optical beam for sensing with one or more detectors 122. According to example embodiments of the invention, the optical detector(s) 122 may be selected for response within certain wavelength spectra windows of interest. For example, a silicon (Si) photo detector may be utilized for monitoring the emission from chemical species in the spectrum ranging from about 0.4 microns to about 1.0 micron. According to another example embodiment, indium gallium arsenide (InGaAs) photodiodes may be selected for measuring infrared wavelengths in the spectrum ranging from about 1.0 micron to about 1.7 microns. Indium-gallium-arsenide/aluminum indium arsenide (InGaAs/AlInAs) or gallium-arsenide/aluminum gallium arsenide (GaAs/AlGaAs) material detector systems can be used for measuring wavelengths in the spectrum ranging from about 3.5 to 24 microns. The optical signals detected by the detectors 122 may be converted by the detectors 122 into electronic detector signals 123 that may be further processed (filtered, amplified, etc.) by the controller 124. The detector signals 123 may be utilized by the controller 124 to dynamically adjust combustor parameters (air/fuel ratios, fuel distribution, mass flow fuel nozzle acoustic impedance, airflow distribution, etc.) to optimize the combustion and emissions parameters associated with the combustor 104.

According to certain example embodiments, the light source 114 may include one or more QC (quantum cascade) lasers. The QC lasers may be fixed or tunable in wavelength. The QC lasers may produce a tunable or chirped wavelength output for exhaust 108 absorption measurements over a particular wavelength spectrum. According to other example embodiments, the light source 114 may include one or more vertical cavity lasers. The vertical cavity lasers may be fixed or tunable in wavelength, and may monitor specific wavelengths, or may have a tunable wavelength output for absorption measurements over a wavelength spectrum. According to yet another example embodiment, the light source(s) 114 may include one or more interband cascade lasers, which may be fixed or tunable in wavelength. In another example embodiment, the light source 114 may comprise multiple lasers or multiple line lasers. In yet another example embodiment, the light source 114 may include a tunable laser diode. According to another example embodiment, the light source 114 may include a wide-band light source such as an Amplified Stimulated Emission (ASE) source, supercontinuum source, or super luminescent light emitting diode (SLED).

The design details of the measurement system for interrogating the exhaust 108 emission species may depend upon on the chemical species of interest, and may range in complexity from a single line laser light source 114, with a single detector 122, to a tunable laser or ASE source. Additional optical components may be included to enable portions of the spectrum to be resolved and measured. According to certain example embodiments, and as mentioned above, a single wavelength (narrow-band) laser or laser diode may be utilized as the light source 114. The narrowband emission from the laser may be matched to an absorption band of an emission chemical species of interest. For example, the laser output wavelength may be matched to particular emission species and measurable absorptions wavelengths, examples of which are presented in Table 1. By matching the wavelength of the light source 114 to one or more of these absorption wavelengths, and by selecting a suitable optical detector 122, a ratio of input to output optical energy can be measured and correlated with the relative concentration of the emission species of interest. According to another example embodiment of the invention, the light source 114 may produce a tunable or chirped-wavelength output, and may enable the measurement of exhaust absorption curves over a spectrum of wavelengths.

According to an example embodiment, multiple laser light sources, such as 114, and multiple corresponding detectors, such as 122, may be utilized for simultaneously measuring multiple combustion species, or for measuring a single combustion species. In one example embodiment, one or more light sources such as 122 may couple into one or more input ports 116, and may utilize co-linear (or roughly parallel) but spatially separated optical paths and may exit a common output port 120 and may be detected with corresponding optical detectors 122 by virtue of the optical path separations or launch angles. In another example embodiment, the multiple light sources may follow individual paths and may utilize dedicated optics (lenses, mirrors, input and output ports, detectors, etc.).

The resulting detected signals 123 may represent an emission species' absorption spectra within the exhaust duct 110. The measured absorption spectra may then be related to the relative concentrations of the emission species of interest, and may be utilized for controlling the parameters of the combustor 104, such as the fuel 126 and air 128 mixtures and/or flow rates. According to another example embodiment, filtering of the light (prior to reaching the detector) may simplify the detector 122 arrangement, and may serve to eliminate crosstalk (via scattering, etc.) from multiple light sources 114. Placing a filter over the detector 122 may also reduce unwanted stray or ambient light. Many combinations and variations of the above-mentioned embodiments may be employed according to other embodiments of the invention.

FIG. 1 shows a block representing the controller 124, which may include detector electronics and the combustion control system. According to an example embodiment, the detector electronics within the controller 124 may be operable to condition, amplify, filter, and process the detector signals 123 from the optical detector(s) 122. The resulting signals may be used as a control signal for the combustion control system via the controller 124. For example, according to an embodiment of the invention, the measured concentration of $NO_2$, or the measured ratio of NOx to $H_2O$ may be utilized as feedback in controller 124, and may provide a control to adjust the fuel/air ratio or flow rate. According to an example embodiment of the invention, the controller 124 may utilize an adaptive algorithm and an associated model that may be tuned by the detector signals 123 produced by the optical detectors(s) 122. The adaptive algorithm may perform closed loop control of emissions control parameters, using detector signals 123 to adjust the model estimations on a semi-continuous basis.

Figure 2:
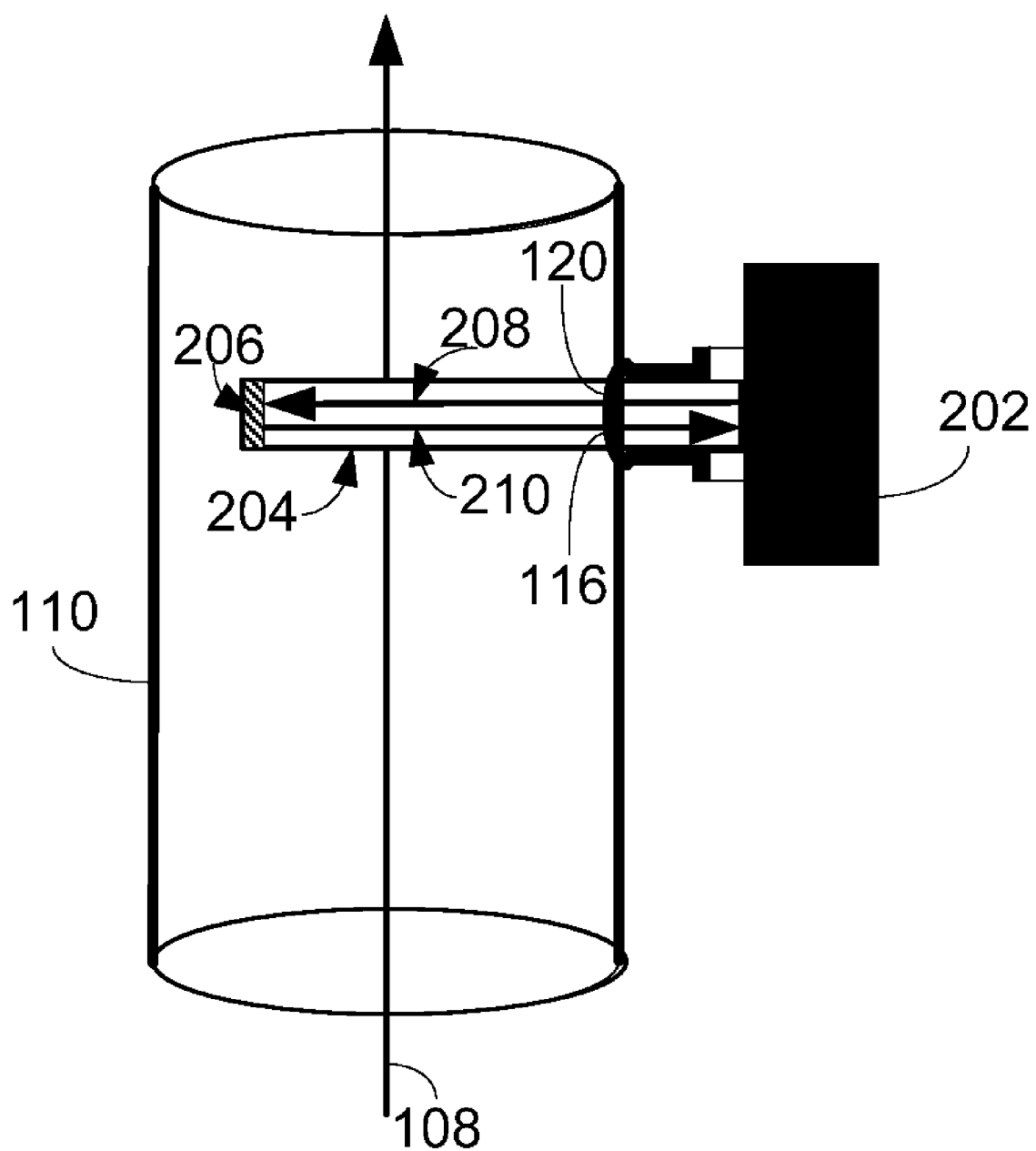
FIG. 2 is a diagram of an illustrative optical interrogation probe, according to an example embodiment of the invention.

FIG. 2 depicts an example optical interrogator probe 204, in accordance with an example embodiment of the invention. In this example embodiment, the input port 116 and output port 120 may be the same physical port, and may comprise a single hole in the sidewall of the exhaust duct 110 to enable insertion of the probe into the exhaust duct 110 for measuring the exhaust 108 stream. According to a certain example embodiment, the light source 114 and the detector 122 may be mounted on the same side of the duct, or housed in a common enclosure 202, as depicted in FIG. 2. The incident light 208 produced by the light source 114 may travel towards the end of the probe 204, and may be reflected by a mirror 206, and the reflected light 210 may return to the enclosure 202 where it may be incident on a detector 122. In this example embodiment, the probe 204 may have an opening to allow the exhaust 108 to interact with the incident 208 and reflected 210 light. This embodiment may eliminate or otherwise minimize the need for separate detector 122 on the opposite side of the exhaust duct 110, and it may also eliminate or otherwise minimize the need for alignment since the optics, including the light source 114, mirror 206, and detector 122, may be pre-aligned within the probe 204 prior to installation. In another certain example embodiment, a detector 122 may be mounted near the end of the probe 204, in place of the mirror 206. Incident light 208 produced by the light source 114 may travel towards the end of the probe 204, while interacting with the exhaust 108, and may be incident on the detector 122 at the end of the probe.

Figure 3:
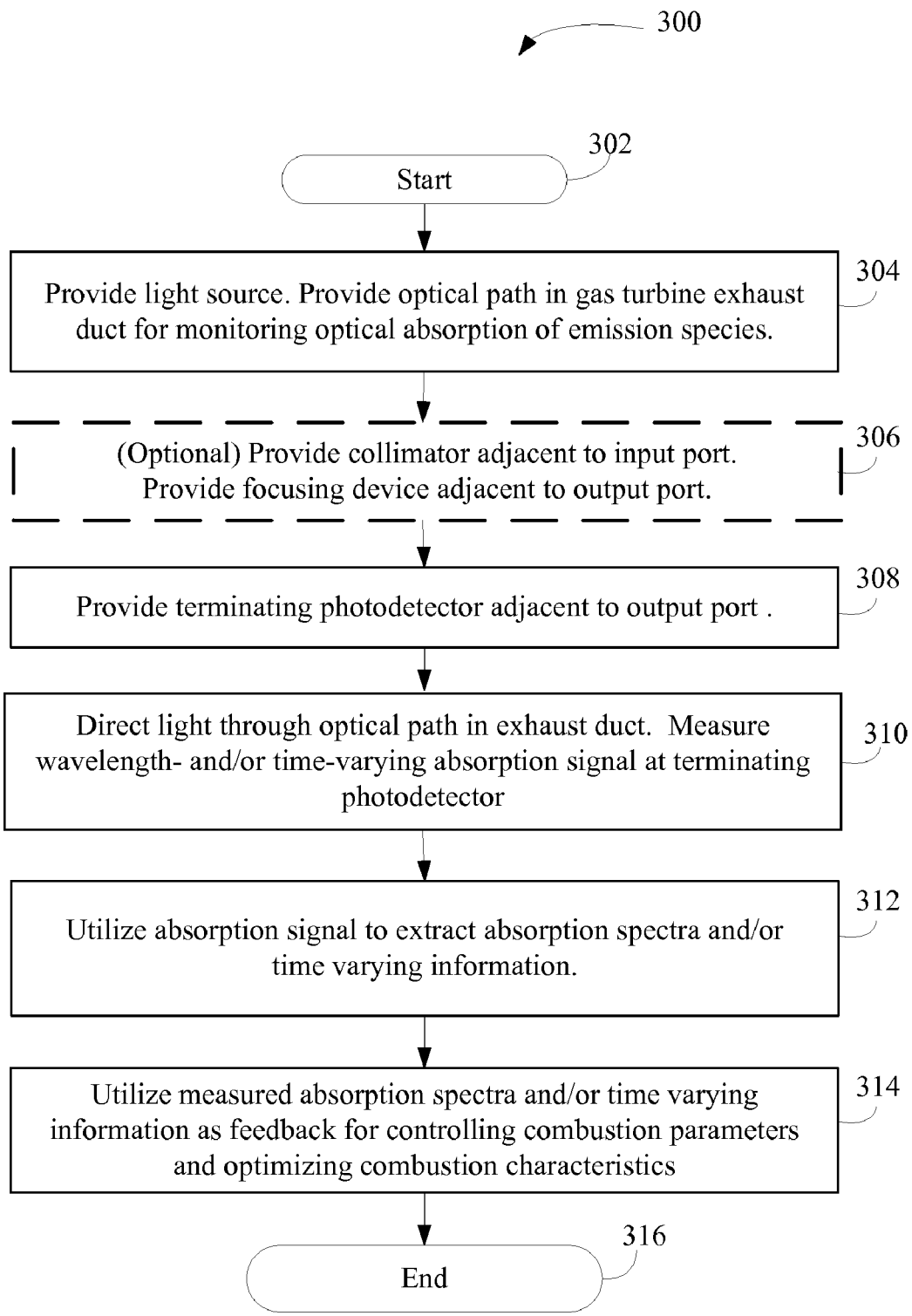
FIG. 3 is a flowchart for an example method according to an example embodiment of the invention.

An example method 300 for measuring exhaust emission species, and for controlling combustion characteristics based on the measurements, will now be described with reference to the flowchart of FIG. 3. The method starts in block 302. In block 304 and according to an example embodiment of the invention, a light source 114 may be provided. At least one optical path may be provided in the body of the exhaust duct 110 or exhaust stack 112 adjacent to a region of interest to allow light 118 from the light source 114 to propagate through and interact with the exhaust 108 for monitoring the emission species present in the exhaust 108 via optical absorption.

In optional block 306, and according to an example embodiment, a collimator may be provided adjacent to the input port 116, if necessary, to correct any beam divergence of the light from the light source 114, and to collimate the beam 118. Adjacent to the output port 120 (which may be physically coincident with the input port 116), a focusing device may be provided to concentrate the modified light after interaction with exhaust 108 within the exhaust duct 110 or exhaust stack 112. According to example embodiments, the focusing device may be a lens or a concave mirror. In block 308, a terminating photodetector 122 may be provided adjacent to the output port 120 and may be operable to accept the modified light after interaction with exhaust 108 within the exhaust duct 110 or exhaust stack 112.

In block 310, and according to an example embodiment, an absorption signal may be obtained by directing light through the optical path in the exhaust duct 110 or exhaust stack 112, and measuring the wavelength-varying and/or time-varying absorption signal at one or terminating photodetectors 122. In block 312, the measurement signal, and in particular, the absorption signal may be utilized to extract absorption spectra and/or time varying information from the measured exhaust 108. In block 314, the extracted absorption spectra and/or time varying measurement information may be utilized to control and optimize the combustion characteristics of the combustor 104 via the controller 124. The extracted emission parameters may be utilized in a feedback control-loop for adjusting the, fuel-to-air ratio, flow rates, fuel distribution among the burners, etc. The method 300 ends in block 316.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of any appended claims. Although specific terms are employed herein, they are used in a generic and descriptive sense only and not for purposes of limitation.

The claimed invention is:

1. A method for controlling combustion emission parameters associated with a gas turbine combustor, the method comprising:
   providing an optical path through a gas turbine exhaust duct downstream of a turbine;
   propagating light along the optical path; measuring exhaust species absorption of the light within the gas turbine exhaust duct; and
   controlling at least one of the combustion parameters based at least in part on the measured exhaust species absorption.

2. The method of claim 1, wherein providing an optical path comprises providing at least one input optical port, an output optical port, and at least one photodetector.

3. The method of claim 1, wherein propagating light along the optical path comprises providing one or more quantum cascade laser light sources and directing light from the light sources along the optical path.

4. The method of claim 1, wherein propagating light along the optical path comprises providing one or more quantum cascade laser for each measured exhaust species.

5. The method of claim 1, wherein propagating light along the optical path comprises propagating narrow-band optical radiation for measurement of exhaust species absorption.

6. The method of claim 1, wherein propagating light along the optical path comprises propagating light within a wavelength range between about 3.5 microns to about 24 microns for measurement of a mid-infrared absorption of the exhaust species.

7. The method of claim 1, wherein the combustion parameters comprise at least one of: fuel flow rate, fuel flow distribution, airflow rate, water injection rate, combustor balancing, or air/fuel ratio.

8. A system for controlling combustion emission parameters associated with a gas turbine combustor, the system comprising:
   one or more photodetectors in communication with an optical path through a gas turbine exhaust duct downstream of a turbine;
   one or more light sources operable to propagate light along the optical path to the one or more photodetectors; and
   a control device operable to control at least one of the combustion emission parameters based at least in part on one or more signals from the one or more photodetectors.

9. The system of claim 8, wherein the optical path comprises at least one input optical port and an output optical port.

10. The system of claim 8, wherein the one or more light sources comprises a narrow-band optical radiation source for measurement of exhaust species absorption.

11. The system of claim 8, wherein the one or more light sources comprises at least one of the following: a quantum cascade laser, a vertical cavity laser, an interband cascade laser, or a tunable diode laser.

12. The system of claim 8, wherein at least one light source is provided for each measured exhaust species.

13. The system of claim 8, wherein the one or more light sources produce light within a wavelength range between about 3.5 microns to about 24 microns for measurement of a mid-infrared absorption of the exhaust species.

14. The system of claim 8, wherein the one or more signals from the one or more photodetectors comprise at least an exhaust species absorption signal.

15. A gas turbine comprising:
   a combustor;
   an exhaust duct;
   an optical path through the exhaust duct downstream of a turbine;

one or more photodetectors in communication with the optical path;

one or more light sources operable to propagate light along the optical path to the one or more photodetectors; and at least one control device operable to control one or more combustion emission parameters based at least in part on one or more signals from the one or more photodetectors.

16. The gas turbine of claim 15, wherein the one or more signals from the one or more photodetectors comprise at least an exhaust species absorption signal.

17. The gas turbine of claim 15, wherein the one or more light sources comprises at least one of the following: a quantum cascade laser, a vertical cavity laser, an interband cascade laser, or a tunable diode laser.

18. The gas turbine of claim 15, wherein at least one light source is provided for each measured exhaust species.

19. The gas turbine of claim 15, wherein the one or more light sources are operable to produce light within a wavelength range of about 3.5 microns to about 24 microns for measurement of a mid-infrared absorption of the exhaust species.

* * * * *